US012561855B2

(12) United States Patent
Odera

(10) Patent No.: US 12,561,855 B2
(45) Date of Patent: Feb. 24, 2026

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Satoru Odera, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 153 days.

(21) Appl. No.: 18/439,959

(22) Filed: Feb. 13, 2024

(65) Prior Publication Data

US 2024/0290005 A1 Aug. 29, 2024

(30) Foreign Application Priority Data

Feb. 24, 2023 (JP) ................................. 2023-027512

(51) Int. Cl.
| *G06T 11/00* | (2006.01) |
| *G06T 11/20* | (2006.01) |
| *G06T 11/60* | (2006.01) |

(52) U.S. Cl.
CPC .......... *G06T 11/001* (2013.01); *G06T 11/203* (2013.01); *G06T 11/60* (2013.01); *G06T 2200/24* (2013.01)

(58) Field of Classification Search
CPC ..................................................... G06T 11/001
See application file for complete search history.

(56) References Cited

U.S. PATENT DOCUMENTS

| 2007/0257904 A1* | 11/2007 | Gerhard | ................ G06F 40/103 |
| | | | 345/419 |
| 2011/0016431 A1* | 1/2011 | Grosz | ..................... G06F 18/24 |
| | | | 715/841 |
| 2022/0138483 A1* | 5/2022 | Zhang | .................... G06V 10/26 |
| | | | 382/176 |

FOREIGN PATENT DOCUMENTS

WO 2020/129201 A1 6/2020

* cited by examiner

*Primary Examiner* — Shivang I Patel
(74) *Attorney, Agent, or Firm* — Venable LLP

(57) ABSTRACT

An information processing apparatus includes an input unit configured to accept an operation by a user and a processing unit configured to process text in response to the operation. In response to the operation, the apparatus transition to an edit state for editing text or a non-edit state. When an editing operation is performed on text that is a target of application of a texture, the apparatus causes a color of the text to change from a first color to a second color. While the state of the text is the edit state, the apparatus does not apply the texture to the text, and after the state of the text becomes the non-edit state, the apparatus applies the texture to the text.

19 Claims, 6 Drawing Sheets

FIG. 1

F I G. 2
201    202
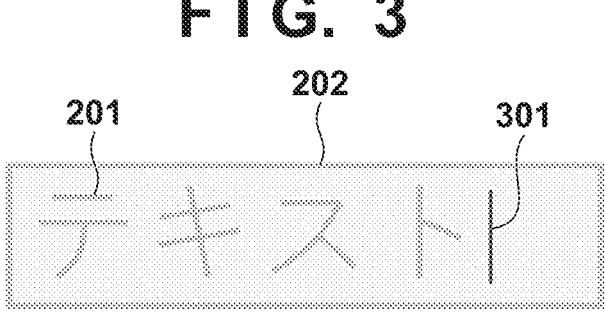
SELECTED STATE
F I G. 3
201    202    301
テキスト
EDIT STATE 201          202          301

EDIT STATE 201          202

SELECTED STATE 201          202          301

EDIT STATE

201

UNSELECTED STATE

F I G. 7
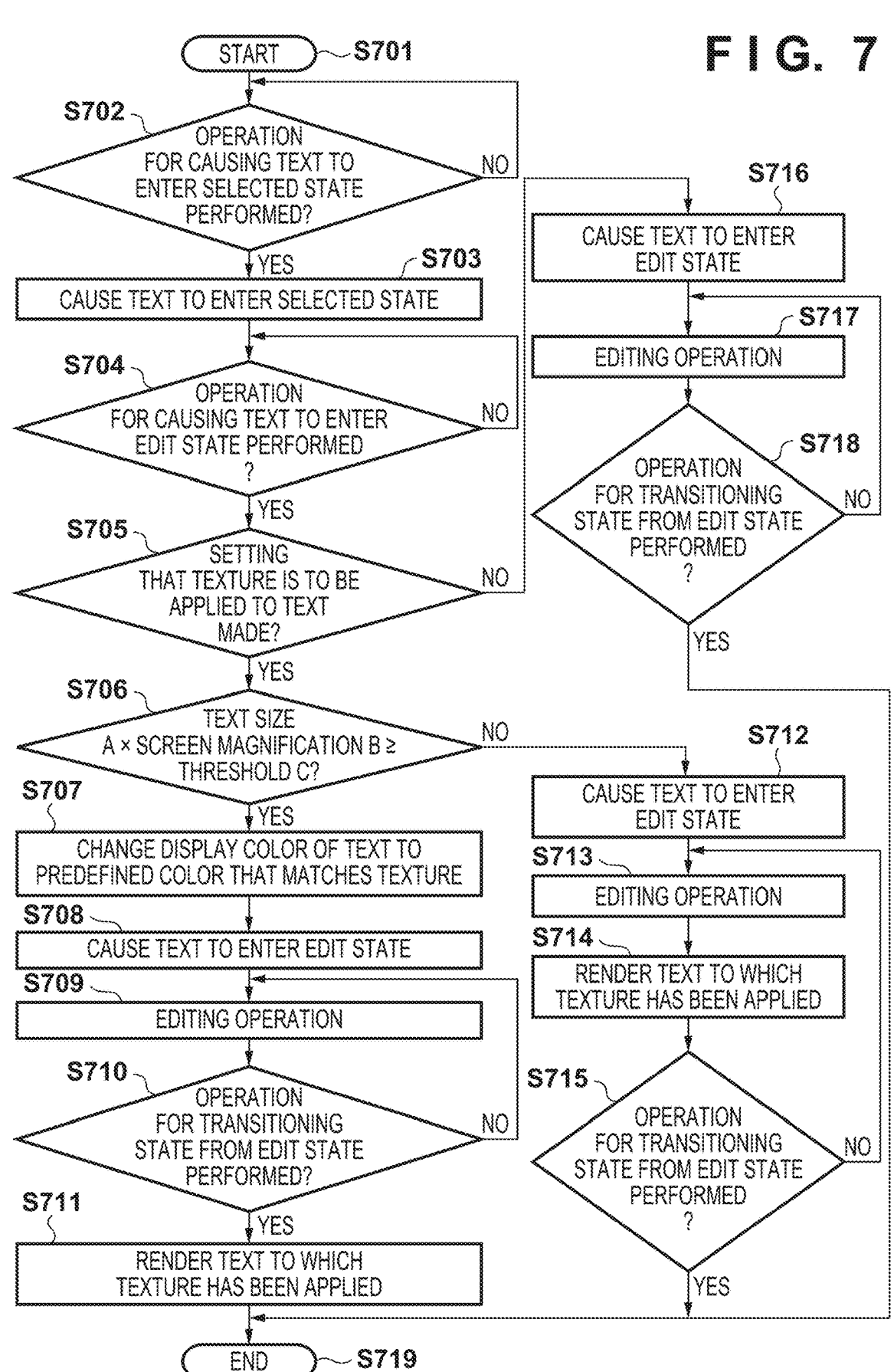

F I G. 8
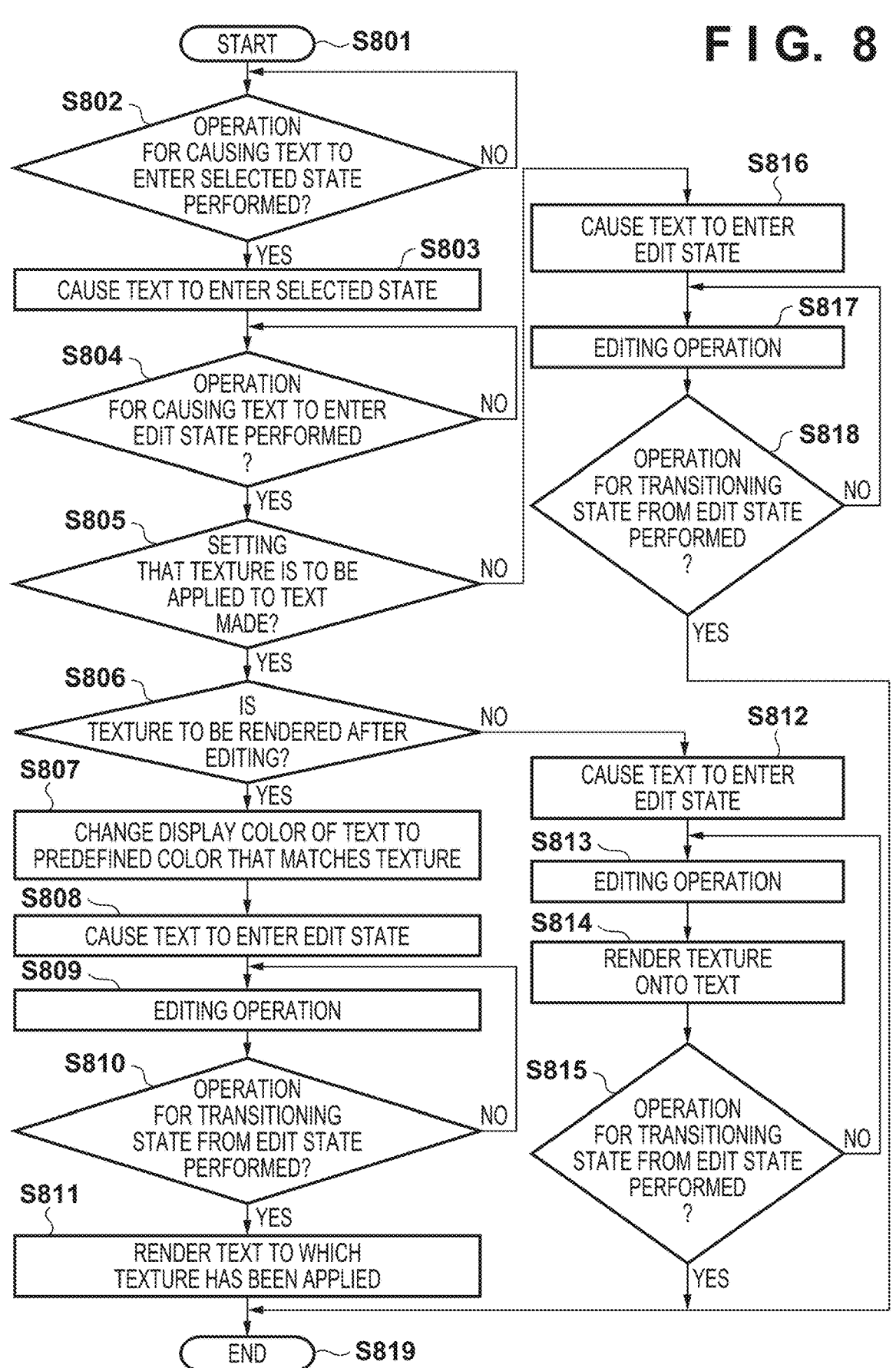

INFORMATION PROCESSING APPARATUS, INFORMATION PROCESSING METHOD, AND STORAGE MEDIUM

BACKGROUND OF THE INVENTION

Field of the Invention

The present invention relates to an information processing apparatus, an information processing method, and a storage medium.

Description of the Related Art

Conventionally, there are techniques in which special effects are implemented by applying effects that are difficult to create, such as metallic and wood textures, to text and objects. One of the known techniques is to apply textures to text and objects and render the text and objects. However, the processing capability necessary for rendering processing varies depending on the specification of the device that performs the rendering processing and the size of the region to which the texture is applied. Therefore, there is a problem that when performing rendering processing in real time, if the processing capability is insufficient, the user operation will stop until the rendering processing ends, that is, user operation-based processing is made to wait for the rendering processing. In order to solve this problem, attempts have been made to shorten the processing time by decreasing the necessary processing capability or by increasing efficiency.

Editing software executes input-based processing in real time and reflects the result of editing work to an editing target so that the result can be confirmed immediately. Therefore, regarding editing work, especially text editing work, a very quick reflection of the result of user input to an editing target is important in ensuring usability. Sometimes, special effects are implemented by applying a texture to text, but the lower the processing capability of the device performing the processing, the longer the time it takes for the rendering processing. As a result, a response to the user input will be delayed by the rendering processing time, so if the processing capability of the device is low, usability will be greatly impaired.

International Publication No. 2020/129201 discloses a method of reducing a processing amount and shortening a processing time by preparing character images to which a texture has been applied in advance and identifying and applying the color values of pixels of a portion corresponding to inputted characters. However, in this method, it is necessary to create in advance the same number of character images as characters that can be inputted and hold that data.

SUMMARY OF THE INVENTION

The present invention has been proposed in view of such circumstances and provides an information processing apparatus, information processing method, and program for preventing a decrease in usability due to a delay in a response to an input in text editing in which a texture is applied.

The information processing apparatus of the present invention includes the following configuration. That is, according to one aspect of the present invention, there is provided an information processing apparatus, comprising: an input unit configured to accept an operation by a user; at least one memory storing at least one program; and at least one processor, wherein the at least one program causes the at least one processor to: in response to the operation, transition a state of text to an edit state for editing text or a non-edit state; when an editing operation is performed on text, cause a color of the text to change from a first color to a second color; and while the state of the text is the edit state, not apply a texture to the text, and after the state of the text becomes the non-edit state, apply the texture to the text.

According to the present invention, it is possible to prevent a decrease in usability due to a delay in a response to an input in text editing in which a texture is applied.

Further features of the present invention will become apparent from the following description of exemplary embodiments with reference to the attached drawings.

BRIEF DESCRIPTION OF THE DRAWINGS

FIG. 1 is a schematic view of a system according to embodiments.

FIG. 2 is a diagram illustrating an example of a text selected state.

FIG. 3 is a diagram illustrating an example of a text edit state.

FIG. 7 is a flowchart of an example of control of an operation for editing text according to text size and screen resolution.

FIG. 8 is a flowchart of an example of control of an operation for editing text according to a determination value set individually for textures.

DESCRIPTION OF THE EMBODIMENTS

Figure 4:
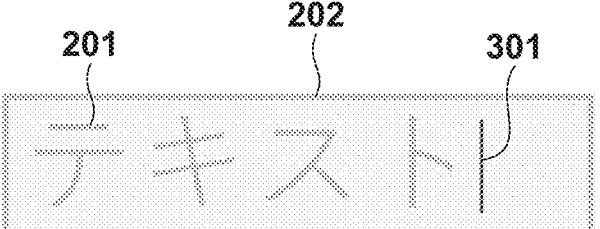
FIG. 4 is a diagram illustrating an example of an operation at the time of transition from a text edit state to a selected state.
Figure 4:
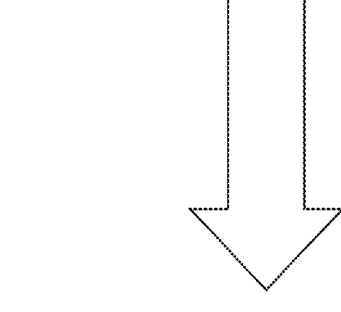
Figure 4:
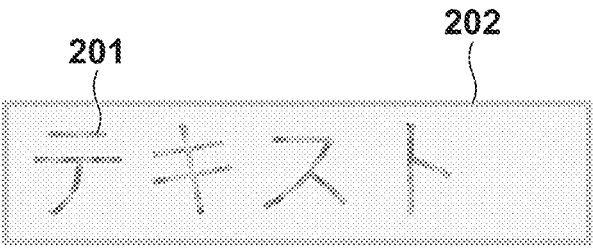

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Figure 1:
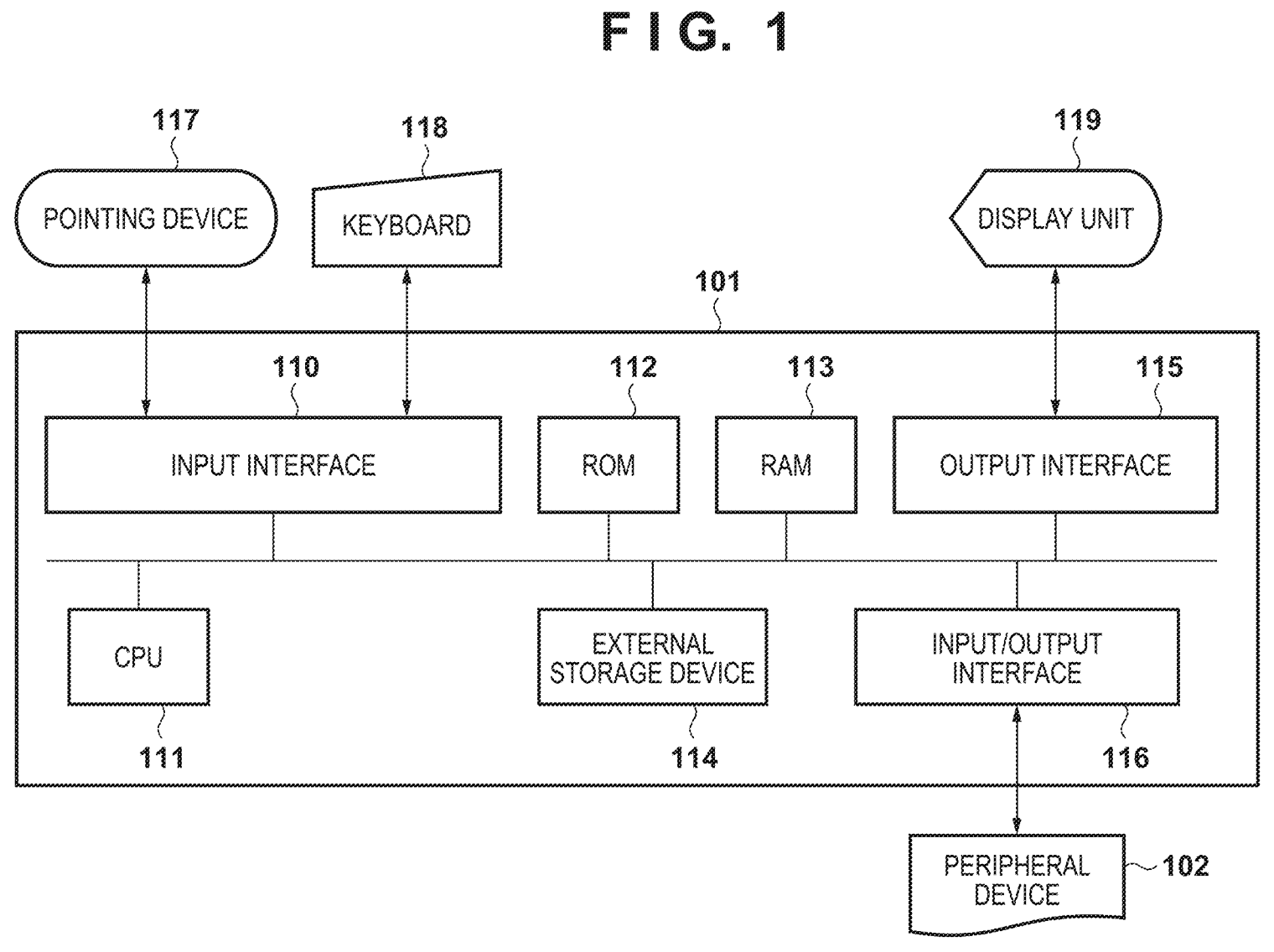

First, an information processing apparatus of the present embodiment will be described with reference to a block diagram of FIG. 1. Further, although in the present embodiment description will be given using the following configuration as an example, it is not particularly intended to limit the functions to what is illustrated in the drawing.

[Information Processing Apparatus]

An information processing apparatus 101 includes an input interface 110, a CPU 111, a ROM 112, a RAM 113, an external storage device 114, an output interface 115, and an input/output interface 116. Further, input devices, such as a keyboard 118 and a pointing device 117, are connected to the input interface 110, and a display device, such as a display unit 119, is connected to the output interface 115. These are connected to each other via a system bus.

The CPU 111 is a system control unit and controls the entire information processing apparatus 101 (e.g., executes programs and starts hardware).

The ROM 112 stores control programs to be executed by the CPU 111, data tables, an embedded operating system (hereinafter referred to as OS), and fixed data of programs and the like.

In the present embodiment, each control program stored in the ROM 112 perform software execution control, such as scheduling, task switching, and interrupt processing, under the control of the embedded OS stored in the ROM 112.

The RAM 113 is configured by a Static Random Access Memory (SRAM), a DRAM, or the like that requires a backup power supply. Regarding the RAM 113, data may be held by a primary battery for data backup (not illustrated). In such cases, the RAM 113 can store important data, such as program control variables, without volatilization. A memory area for storing setting information of the information processing apparatus 101, management data of the information processing apparatus 101, and the like is also provided in the RAM 113. The RAM 113 is also used as a main memory and a working memory of the CPU 111.

The external storage device 114 stores various application programs (applications) and content data handled by the applications, and the like.

The display unit 119 is configured by a light emitting diode (LED), a liquid crystal display (LCD), or the like and displays data and notifies the state of the information processing apparatus 101. By providing a virtual keyboard provided with keys, such as numerical value input keys, a mode setting key, an enter key, a cancel key, and a power key, on the display unit 119, input from the user may be accepted via the display unit 119.

The input/output interface 116 is a component for executing various kinds of data communication by connecting with a peripheral device 102.

Further, in the present embodiment, textures applicable to a text object are assumed to include metallic textures. Specifically, the metallic textures are assumed to include a total of four types of pattern images: two types of pattern images as textures (gold metallic textures) simulating gold embellishments and two types of pattern images as textures (silver metallic texture) simulating silver embellishments. A plurality of textures applicable to a text object are presented to a user in a selectable state. Then, a texture selected by the user is applied to the text object. The textures are represented not by a single color but by a plurality of colors, and so, the text object to which a texture has been applied will also be represented by a plurality of colors. The present invention is not limited to the above-described four patterns of textures and is assumed to be applicable to other textures to be represented, such as wood, canvas, and glass textures.

Editing target text may be all or part of document data (or text data) that only includes text or may be part of document data that also includes image data, graphical data, and the like. The document data is stored in the external storage device 114 and is edited after being loaded into the RAM 113. A texture to be applied to text may be texture data stored separately from the document data or may be stored as part of the document data. When a texture is applied to text, information identifying target text and information associating that text and the texture may also be stored as part of the document data. In addition, the font type, size, and the like of characters may be specified separately and stored in association with the text. Application of a texture to text is processing for pasting a texture onto target text and is processing for compositing and rendering a texture in a character region of a character image corresponding to the text.

Hereinafter, some embodiments of an information processing method in which the information processing apparatus having the above-described configuration is assumed as a common embodiment will be described.

First Embodiment

Figure 5:
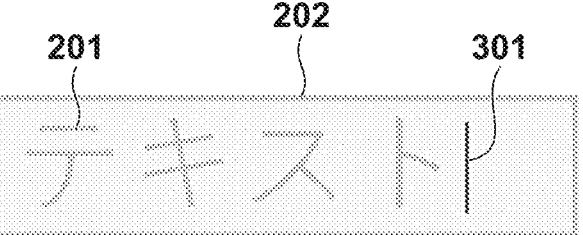
FIG. 5 is a diagram illustrating an example of an operation at the time of transition from a text edit state to an unselected state.
Figure 5:
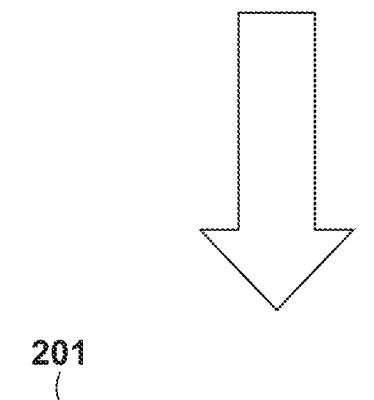
Figure 6:
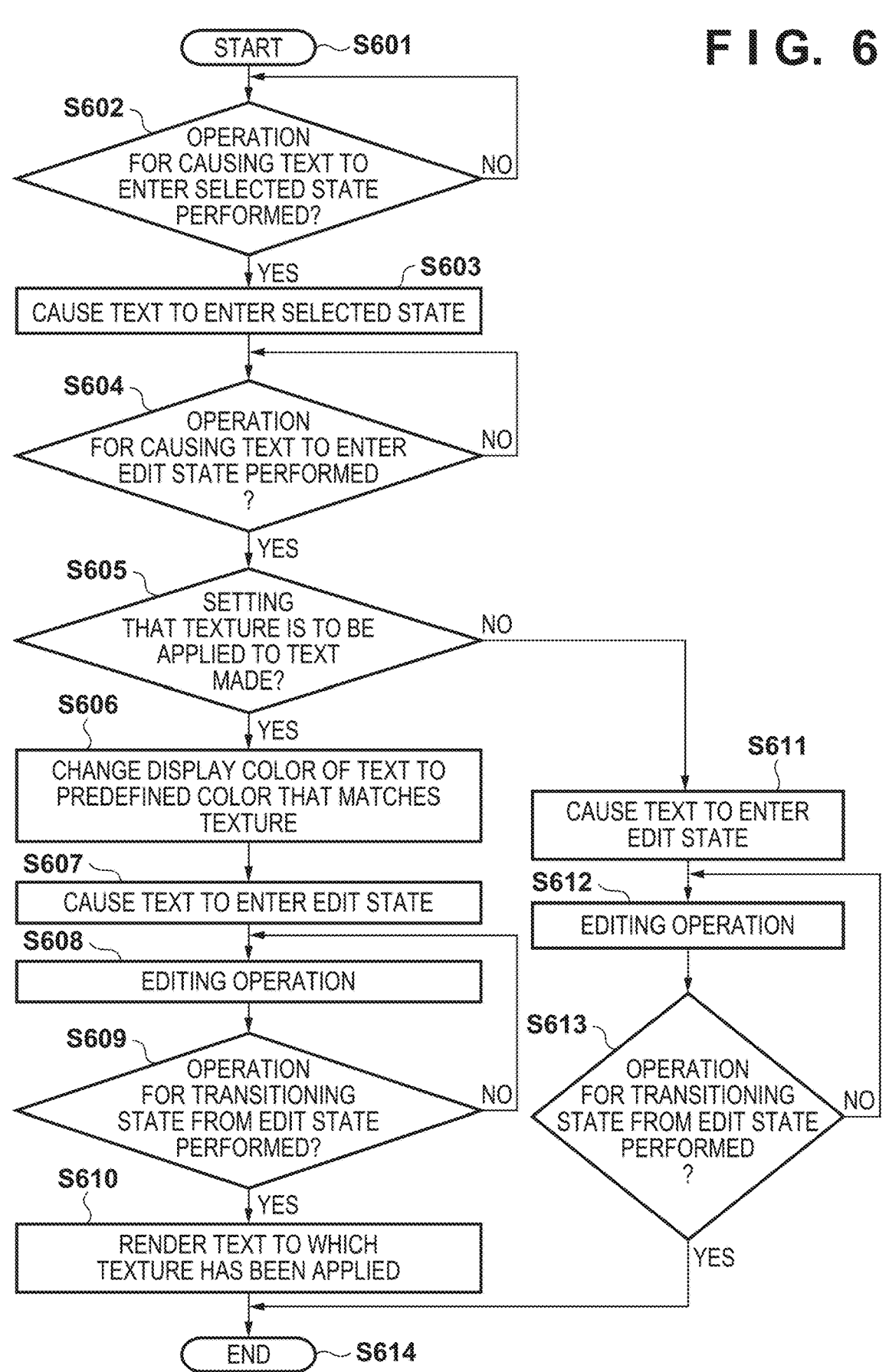
FIG. 6 is a flowchart of an example of an operation for editing text.

FIG. 2 illustrates display of a selection frame 202 when a text object 201 is in a selected state. FIG. 3 illustrates display of an editing cursor 301 in addition to the selection frame 202 when the text object 201 is in an edit state. FIG. 4 illustrates rendering of text to which a texture has been applied when the state transitions from the edit state to the selected state. FIG. 5 illustrates rendering of texture when the state transitions from the edit state to an unselected state. FIG. 6 is a flowchart for explaining a behavior for when the state transitions from the edit state in FIGS. 4 and 5.

For example, when text is selected, that text enters a selected state, and when an editing operation is performed on the selected text, the text enters an edit state. A configuration in which, when an editing operation is performed on text without the text being selected, the text enters the edit state may be taken. In addition, when the outside of a certain region that includes selected text, such as a rectangular region surrounding the text, is selected, that text enters a non-edit state. In this case, the text simultaneously enters the unselected state. Regarding the states of text including the edit state, the selected state, and the unselected state, the value of a state variable associated with target text need only be set to a value corresponding to a respective state, for example. The state variable may be stored in the RAM 113. As in the above-described example, in the present embodiment, the selected state and the edit state of text may coexist and are not exclusive states. Meanwhile, the selected state and the unselected state may have an exclusive relationship. Accordingly, specifically, a binary variable indicating either the selected state or the unselected state and a binary variable indicating either the edit state or the non-edit state may be provided as state variables. Of course, this is only one example; another state variable may be held, and the state may be indicated using a method different from state variables.

Furthermore, if selectable text is limited to one character region that contains a continuous character string, the state variables need only be associated with that only region, and thus, there need only be one set of state variables. In contrast to this, if a plurality of character regions can be selected, the state variables are associated with respective character regions, and thus, there needs to be held state variables for which the number of sets thereof corresponds to that of selectable character regions. In the present embodiment, for convenience of description, selectable text is assumed to be included in one character region, but a plurality of character regions may be set as targets.

Text Editing Processing

Step S601 of FIG. 6 starts on condition that an operation has been performed on a document editing screen of an application.

In step S602, the CPU 111 determines whether an operation for causing text to enter the selected state in conjunction with the keyboard 118 and a movement of the pointing device 117 has been performed. If it is determined that an operation for causing text to enter the selected state has been performed, in step S603 the CPU 111 causes the text object 201 to transition to the selected state and displays the selection frame 202 on the display unit 119 via the output interface 115. Next, in step S604, the CPU 111 determines whether an operation for causing text to enter the edit state in conjunction with the keyboard 118 and a movement of the pointing device 117 has been performed.

If it is determined that an operation for causing text to enter the edit state has been performed, in step S605 the CPU 111 then determines whether a setting that a texture is to be applied to the text object 201 has been made. Regarding the determination, it may be determined, for example, whether there is information associating a texture with the selected text object 201, and if there is such information, determine that a setting that a texture is to be applied has been made. If it is determined that a setting that a texture is to be applied to the text object 201 has been made, in step S606 the CPU 111 changes a display color of the text object 201 displayed on the display unit 119 to a color that matches the texture (different color based on the type of texture). The color of the text object 201 before the change to the color that matches the texture may be a color arbitrarily selected by the user or black and fixed. The color change here can be performed without rendering the text object. The change of display in the display unit 119 by the CPU 111 is performed via the output interface 115. Since it is similar for other processes, the description, "via the output interface 115", may be omitted.

The color to be determined in step S606 (color that matches the texture) is assumed to be a single color. In other words, a text object that has been changed to a color that matches the texture is an object that is represented by a single color and is represented by colors that are fewer in the number of colors than those representing the texture. In addition, the color that matches the texture may be one of the colors constituting the texture or may particularly be a dominant color among them. The dominant color may be the color of pixels that is the most prevalent among the colors of the texture. This color may be predetermined for each texture or may be predetermined by the user. This color is referred to as an alternative color of the texture or simply the alternative color. The alternative color is used to reduce the load of the rendering processing and thus may be a single color. More specifically, for example, if the texture is a gold metallic texture, the color that matches the texture will be yellow. For example, if the texture is a silver metallic texture, the color that matches the texture will be gray. For example, if the texture is a wood texture, the color that matches the texture will be brown.

Then, in step S607, the CPU 111 causes the text object 201 to transition to the edit state. Next, in step S608, the CPU 111 accepts a desired editing operation of the user performed via the input interface 110 from the keyboard 118 and the pointing device 117. While the editing operation is being performed in step S608, a texture will not be applied to the editing target text even if there is a texture associated with the editing target text, and the text will be displayed in the changed color to which the change has been made in step S606. In step S609, the CPU 111 determines whether the accepted operation is an operation for causing the text object 201 to transition from the edit state to the selected state or the unselected state.

When an operation for causing the text object 201 to transition from the edit state to the selected state or the unselected state has been performed, that is, when it is determined that the accepted operation is an operation for causing the editing target text to transition from the edit state to another state, the processing branches to step S610. Here, a state that is not the edit state is also referred to as a non-edit state. In step S610, the CPU 111 renders the text object 201 to which the texture has been applied and displays the text object 201 on the display unit 119. Thus, the text object 201 will no longer have the above-described color that matches the texture and will take on colors of the texture itself. The text object 201 also transitions its state from the edit state to another state, such as the selected state or the unselected state. Meanwhile, if it is determined in step S609 that the accepted operation is an operation that does not involve a state transition, such as an editing operation, the edit state is maintained by branching to step S608, and operations continue to be accepted.

If it is determined in step S605 that a setting that a texture is to be applied to the text object 201 has not been made, in step S611 the CPU 111 causes the text object 201 to transition to the edit state. Next, in step S612, the CPU 111 accepts a desired editing operation of the user performed via the input interface 110 from the keyboard 118 and the pointing device 117. While an editing operation is being performed in step S612, the editing target text may be displayed in a predetermined color or in a separately specified color. In step S613, the CPU 111 determines whether the accepted operation is an operation for causing the text object 201 to transition from the edit state to the selected state or the unselected state. If an operation for causing the text object 201 to transition from the edit state to the selected state or the unselected state has been performed, the text object 201 transitions its state from the edit state to another state. Meanwhile, if it is determined in step S613 that the accepted operation is an operation that does not involve a state transition, such as an editing operation, the edit state is maintained by branching to step S612, and operations continue to be accepted.

According to the above-described embodiment, if an editing operation is performed on a text object for which a setting that a texture is to be applied has been made, the rendering processing whose processing time is long will not be performed during the editing operation. Therefore, it is possible to prevent a response to an input from being delayed, and thus, it is possible to provide an editing operation with superior usability (i.e., operability).

Variation

In the example of FIG. 6, an editing operation is performed on the selected text, but an editing operation may be performed without a selection operation. In such cases, step S602 and step S603, which are a step for determining operation for causing text to enter the selected state and a step for causing text to enter the selected state, need not be performed. Alternatively, the editing target text may be considered to have been selected.

In the present embodiment, the state of the text may assume the states which are the edit state, the non-edit state, the selected state, and the unselected state. However, it is possible to omit the selected state/unselected state, and only assume the edit state and the non-edit state. In such cases, the target text cannot be selected, and so, in step S607 and step S611 in which the text is caused to enter the edit state in FIG. 6, a series of text from the beginning to the end may be caused to enter the edit state.

The two above variations can be similarly applied to other embodiments. However, reference numerals will be those of respective steps corresponding to the other embodiments.

Second Embodiment

The first embodiment describes an example in which, if a setting that a texture is to be applied to the text object 201 has been made, a texture is applied at the time of transition from the edit state to another state on condition that transition to the edit state has been made. In the first embodiment, there are no other conditions. In the present embodiment, an example in which a text size and a screen magnification have been added to the condition of the first embodiment will be described. For example, if a setting that a texture is to be applied to the text has been made, a switch is made between applying the texture after editing the text and applying the texture in real time during editing on condition of the text size and the screen magnification. This is because if the text size of text to which a texture is to be applied is small, the time it takes for texture application processing will be short, and it will be less likely to cause a response delay that would cause an operator to be frustrated or elicit incorrect input.

FIG. 7 is a flowchart of processing for applying a texture at the time of transition from the edit state to another state on condition that a setting that a texture is to be applied to the text object 201 has been made and transition to the edit state has been made as well as on condition of a combination of the text size and the screen magnification.

Step S701 of FIG. 7 starts on condition that an operation has been performed on a document editing screen of the application. In step S702, the CPU 111 determines whether an operation for causing text to enter the selected state in conjunction with the keyboard 118 and a movement of the pointing device 117 has been performed. If it is determined that an operation for causing text to enter the selected state has been performed, in step S703 the CPU 111 causes the text object 201 to transition to the selected state and displays the selection frame 202 on the display unit 119 via the output interface 115. Next, in step S704, the CPU 111 determines whether an operation for causing text to enter the edit state in conjunction with the keyboard 118 and a movement of the pointing device 117 has been performed.

If it is determined that an operation for causing text to enter the edit state has been performed, in step S705 the CPU 111 then determines whether a setting that a texture is to be applied to the text object 201 has been made. The determination may be performed in the same manner as in the first embodiment. If it is determined that a setting that a texture is to be applied to the text object 201 has been made, in step S706 the CPU 111 calculates a display size by multiplying a text size A, which has been set for the text object 201, and a screen magnification B. Then, it is determined whether the calculated display text size is greater than or equal to a threshold C.

If it is determined that the display text size is greater than or equal to the threshold C, in step S707 the CPU 111 changes a display color of the text object 201 displayed on the display unit 119 to a color that matches the texture. This color may be one of the colors constituting the texture or may particularly be a dominant color among them. The dominant color may be the color of pixels that is the most prevalent among the colors of the texture. This color may be predetermined for each texture or may be preset by the user. Then, in step S708, the CPU 111 causes the text object 201 to transition to the edit state.

Next, in step S709, the CPU 111 accepts a desired editing operation of the user performed via the input interface 110 from the keyboard 118 and the pointing device 117. In step S710, the CPU 111 determines whether the accepted operation is an operation for causing the text object 201 to transition from the edit state to another state, such as the selected state or the unselected state. If it is determined that the accepted operation is an operation for causing the text object 201 to transition from the edit state to another state, such as the selected state or the unselected state, the processing branches to step S711. In step S711, the CPU 111 renders the text object 201 to which the texture has been applied, displays the text object 201 on the display unit 119 via the output interface 115, and causes the text object 201 to transition from the edit state to another state.

Thus, if the size of the editing target text is greater than or equal to the threshold, during editing the editing target text is displayed without the texture applied. Then, when editing of the text is finished, at that stage the text is displayed with the texture applied. While an editing operation is being performed in step S709, the editing target text is displayed in the changed color to which the change has been made in step S707. Meanwhile, if it is determined in step S710 that the accepted operation is an operation that does not involve a state transition, such as an editing operation, the edit state is maintained by branching to step S709, and operations continue to be accepted.

If it is determined in step S706 that the display text size is less than the threshold C, in step S712 the CPU 111 causes the text object 201 to transition to the edit state. Next, in step S713, the CPU 111 accepts a desired editing operation of the user performed via the input interface 110 from the keyboard 118 and the pointing device 117. In step S714, the CPU 111 renders the text object 201 to which the texture has been applied and displays the text object 201 on the display unit 119 via the output interface 115. Thus, if the display size of the editing target text is less than the threshold, even during an editing operation, the editing target text is displayed with the texture applied.

In step S715, the CPU 111 determines whether the accepted operation is an operation for causing the text object 201 to transition from the edit state to another state, such as the selected state or the unselected state. If it is determined that the accepted operation is an operation for causing the text object 201 to transition from the edit state to another state, such as the selected state or the unselected state, the text object 201 is caused to transition from the edit state. Meanwhile, if it is determined in step S715 that the accepted operation is an operation that does not involve a state transition, such as an editing operation, the edit state is maintained by branching to step S713, and operations continue to be accepted. In this case, the text edited according to the editing operation is displayed with the texture is applied.

If it is determined in step S705 that a setting that a texture is to be applied to the text object 201 has not been made, in step S716 the CPU 111 causes the text object 201 to transition to the edit state. Next, in step S717, the CPU 111 accepts a desired editing operation of the user performed via the input interface 110 from the keyboard 118 and the pointing device 117. In step S718, the CPU 111 determines whether the accepted operation is an operation for causing the text object 201 to transition from the edit state to another state, such as the selected state or the unselected state. If it is determined that an operation for causing the text object 201 to transition from the edit state to another state, such as the selected state or the unselected state, has been performed, the text object 201 is caused to transition from the edit state. Meanwhile, if it is determined in step S718 that the accepted operation is an operation that does not involve a state transition, such as an editing operation, the edit state is maintained by branching to step S717, and operations continue to be accepted.

According to the above-described embodiment, in addition to the first embodiment, in a case where, due to the display text size, it does not take a long time to perform processing for rendering text to which a texture has been applied, the editing operation can be provided with the text object to which the texture has been applied. Here a case where it does not take a long time to perform processing for rendering text to which a texture has been applied is, in the example of FIG. 7, a case where the size of text to be displayed is less than a predetermined threshold. Meanwhile, if it takes a long time to perform the rendering processing, an editing operation can be provided with a text object to which a texture has not been applied as the target. Therefore, it is possible to prevent a response to an input from being delayed, and thus, it is possible to provide an editing operation with superior usability (i.e., operability).

Variation

Although it is determined in step S706 of FIG. 7 whether the display size of characters is greater than or equal to the threshold, the number of characters of editing target text according to the editing operation may also be taken into consideration. In that case, in step S706, a value of the text size A×the screen magnification B×the number of characters to be edited C is obtained and is compared with a predetermined threshold; if the obtained value is greater than or equal to the threshold, the processing branches to step S707, and otherwise, the processing branches to step S712.

Third Embodiment

In the second embodiment, an example in which a text size and a screen magnification have been added to the condition of the first embodiment has been described. In the present embodiment, an example of a case where a texture being assigned a setting that a texture is to be applied to text after transition to the non-edit state has been added to the conditions of the first embodiment will be described.

FIG. 8 is a flowchart of processing for rendering the text object 201 to which a texture has been applied at the time of transition from the edit state to another state in the present embodiment. In the present embodiment, regarding the conditions for applying a texture to the text being edited, it is assumed that a setting that a texture is to be applied to the text object 201 has been made and a setting that a texture is to be applied to the text after transition to the non-edit state has been assigned to the texture. Regarding the setting, a variable indicating the setting may be assigned in association with a texture, for example. Alternatively, identification information (e.g., name, etc.) for identifying the corresponding texture may be registered in advance. In any case, assigning a setting that a texture is to be applied to text after transition to the non-edit state to the texture may be, in other words, that the texture to be applied to the text is a specific texture.

Step S801 of FIG. 8 starts on condition that an operation has been performed on a document editing screen of the application. In step S802, the CPU 111 determines whether an operation for causing text to enter the selected state in conjunction with the keyboard 118 and a movement of the pointing device 117 has been performed. If it is determined that an operation for causing text to enter the selected state has been performed, in step S803 the CPU 111 causes the text object 201 to transition to the selected state and displays the selection frame 202 on the display unit 119 via the output interface 115. Next, in step S804, the CPU 111 determines whether an operation for causing text to enter the edit state in conjunction with the keyboard 118 and a movement of the pointing device 117 has been performed.

If it is determined that an operation for causing text to enter the edit state has been performed, in step S805 the CPU 111 then determines whether a setting that a texture is to be applied to the text object 201 has been made. The determination may be performed in the same manner as in the first embodiment. If it is determined that a setting that a texture is to be applied to the text object 201 has been made, the processing branches to step S806. In step S806, the CPU 111 determines whether the texture set for the text object 201 is a texture to be applied to text after transition from the edit state to another state.

The determination may be made, for example, for each texture name (e.g., the name of the texture file) based on a pre-set setting as to whether to apply the texture after transition from the edit state to another state. Regarding the setting, it may be set so as to apply a texture after transition from the edit state to another state if the time it takes to render the texture is longer than a reference time and to apply the texture during editing if the time is shorter. In this case, for example, the time it takes to render a texture for predetermined text of a predetermined size may be measured or estimated.

If it is determined in step S806 that a texture is to be applied to the text after transition from the edit state to another state, the processing branches to step S807. In step S807, the CPU 111 changes a display color of the text object 201 displayed on the display unit 119 via the output interface 115 to a color that matches the texture. This color may be one of the colors constituting the texture or may particularly be a dominant color among them. The dominant color may be the color of pixels that is the most prevalent among the colors of the texture. This color may be predetermined for each texture or may be predetermined by the user. Then, in step S808, the CPU 111 causes the text object 201 to transition to the edit state.

Next, in step S809, the CPU 111 accepts a desired editing operation of the user performed via the input interface 110 from the keyboard 118 and the pointing device 117. In step S810, the CPU 111 determines whether the accepted operation is an operation for causing the text object 201 to transition from the edit state to another state, such as the selected state or the unselected state. If it is determined that the accepted operation is an operation for causing the text object 201 to transition from the edit state to another state, such as the selected state or the unselected state, the processing branches to step S811. In step S811, the CPU 111 renders the text object 201 to which the texture has been applied, displays the text object 201 on the display unit 119 via the output interface 115, and causes the text object 201 to transition from the edit state to another state.

Thus, if the texture associated with the editing target text is a texture to be applied after the text has transitioned to a state other than the edit state, during editing the text to be edited is displayed without the texture applied to the text. Then, when editing of the text is finished, at that stage the text is displayed with the texture applied. While an editing operation is being performed in step S809, the editing target text is displayed in the changed color to which the change has been made in step S807. Meanwhile, if it is determined in step S810 that the accepted operation is an operation that does not involve a state transition, such as an editing operation, the edit state is maintained by branching to step S809, and operations continue to be accepted.

If it is determined in step S806 that the texture is not a texture to be applied to the text after transition from the edit state to another state, in step S812 the CPU 111 causes the text object 201 to transition to the edit state. Next, in step S813, the CPU 111 accepts a desired editing operation of the user performed via the input interface 110 from the keyboard 118 and the pointing device 117. In step S814, the CPU 111 renders the text object 201 to which the texture has been applied and displays the text object 201 on the display unit 119 via the output interface 115. Thus, if the texture is not a texture to be applied to text after transition from the edit state to another state, even if it is during the editing operation, the editing target text is displayed with the texture applied.

In step S815, the CPU 111 determines whether the accepted operation is an operation for causing the text object 201 to transition from the edit state to another state, such as the selected state or the unselected state. If it is determined that the accepted operation is an operation for causing the text object 201 to transition from the edit state to another state, such as the selected state or the unselected state, the text object 201 is caused to transition from the edit state. Meanwhile, if it is determined in step S815 that the accepted operation is an operation that does not involve a state transition, such as an editing operation, the edit state is maintained by branching to step S813, and operations continue to be accepted. In this case, the text edited according to the editing operation is displayed with the texture is applied.

If it is determined in step S805 that a setting that a texture is to be applied to the text object 201 has not been made, in step S816 the CPU 111 causes the text object 201 to transition to the edit state. Next, in step S817, the CPU 111 accepts a desired editing operation of the user performed via the input interface 110 from the keyboard 118 and the pointing device 117. In step S818, the CPU 111 determines whether the accepted operation is an operation for causing the text object 201 to transition from the edit state to another state, such as the selected state or the unselected state. If it is determined that an operation for causing the text object 201 to transition from the edit state to another state, such as the selected state or the unselected state, has been performed, the text object 201 is caused to transition from the edit state. Meanwhile, if it is determined in step S818 that the accepted operation is an operation that does not involve a state transition, such as an editing operation, the edit state is maintained by branching to step S817, and operations continue to be accepted.

According to the above embodiment, in addition to the first embodiment, it is possible to provide an editing operation for a text object to which the texture has been applied or for a text object to which the texture has not been applied, depending on the texture to be applied to the text. Furthermore, by determining that distinction based on the time of the rendering processing of a text object to which the texture has been applied, it is possible to prevent a response to an input from being delayed, and thus, it is possible to provide an editing operation with superior usability (i.e., operability).

Other Embodiments

The condition of step S706 of the second embodiment and the condition of step S806 of the third embodiment may be combined. In that case, for example, in FIG. 7, if it is determined in step S706 that the condition has been satisfied, then step S806 will be executed. If it is also determined in step S806 that the condition has been satisfied, the processing branches to step S707. Meanwhile, if at least one of the condition of step S706 and the condition of step S806 is not satisfied, the processing branches to step S712.

In the above-described embodiments, only a text object is a target of texture application, but another object to which a texture is to be applied, such as a shape, may be made a target, and a timing at which to apply a texture may be set to after transition from the edit state to another state.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-027512, filed Feb. 24, 2023, which is hereby incorporated by reference herein in its entirety.

What is claimed is:

1. An information processing apparatus comprising:
an input unit configured to accept an operation by a user;
at least one memory storing at least one program; and
at least one processor, wherein the at least one program causes the at least one processor to:
(1) in response to the operation, transition a state of text to an edit state for editing text or a non-edit state;
(2) when an editing operation is performed on text, cause a color of the text to change from a first color to a second color; and
(3) while the state of the text is the edit state, not apply a texture to the text, and after the state of the text becomes the non-edit state, apply the texture to the text.

2. The information processing apparatus according to claim 1, wherein
the second color is a color that is based on the texture and is different from the first color.

3. The information processing apparatus according to claim 1, wherein
in a case where the text is a target of application of a texture, (1) while the state of the text is the edit state, the texture is not applied to the text, and (2) after the state of the text becomes the non-edit state, the texture is applied to the text.

4. The information processing apparatus according to claim 1, wherein in a case where the text is a target of application of a texture and a size of the text that is the target of application of the texture is greater than or equal to a threshold, (1) while the state of the text is the edit state, the texture is not applied to the text, and (2) after the state of the text becomes the non-edit state, the texture is applied to the text.

5. The information processing apparatus according to claim 1, wherein in a case where the text is a target of application of a texture and the texture to be applied to the text is a predetermined texture, (1) while the state of the text is the edit state, the texture is not applied to the text, and (2) after the state of the text becomes the non-edit state, the texture is applied to the text.

6. The information processing apparatus according to claim 1, wherein even if an editing operation is performed on text that is a target of application of the texture, in a case where a size of the text that is the target of application of the texture is not greater than or equal to a threshold, even if the state of the text is the edit state, the texture is applied to the text.

7. The information processing apparatus according to claim 1, wherein in a case where an editing operation is performed on text that is a target of application of the texture and the texture to be applied to the text is a first texture, (1) while the state of the text is the edit state, the texture is not applied to the text, and (2) after the state of the text has become the non-edit state, the texture is applied to the text, and wherein even if an editing operation is performed on text that is the target of application of the texture, in a case where the texture to be applied to the text is a second texture and in a case where a size of the text that is the target of application of the texture is not greater than or equal to a threshold, even if the state of the text is the edit state, the texture is applied to the text.

8. The information processing apparatus according to claim 1, further comprising:

a display configured to display editing target text.

9. The information processing apparatus according to claim 1, wherein by rendering of a character with which texture has been composited in a character region of the text, the texture is applied to the text.

10. A computer-readable non-transitory storage medium storing computer code, and when a computer executes the computer code, the computer executes an information processing method, the method comprising:

in response to the operation, transitioning a state of text to an edit state for editing text or a non-edit state;

when an editing operation is performed on text that is a target of application of a texture, causing a color of the text to change from a first color to a second color; and while the state of the text is the edit state, not applying the texture to the text, and after the state of the text becomes the non-edit state, applying the texture to the text.

11. An information processing method to be executed by an information processing apparatus including (1) an input unit configured to accept an operation by a user and (2) a processing unit configured to process text in response to the operation, the method comprising:

in response to the operation, the processing unit causing a state of text to transition to an edit state for editing text or a non-edit state;

when an editing operation is performed on text that is a target of application of a texture, the processing unit causing a color of the text to change from a first color to a second color; and while the state of the text is the edit state, not applying the texture to the text, and after the state of the text becomes the non-edit state, applying the texture to the text.

12. The information processing method according to claim 11, wherein the second color is a color that is based on the texture and is different from the first color.

13. The information processing method according to claim 11, wherein in a case where the text is a target of application of a texture, (1) while the state of the text is the edit state, the texture is not applied to the text, and (2) after the state of the text becomes the non-edit state, the texture is applied to the text.

14. The information processing method according to claim 11, wherein in a case where the text is a target of application of a texture and a size of the text that is the target of application of the texture is greater than or equal to a threshold, (1) while the state of the text is the edit state, the texture is not applied to the text, and (2) after the state of the text becomes the non-edit state, the texture is applied to the text.

15. The information processing method according to claim 11, wherein in a case where the text is a target of application of a texture and the texture to be applied to the text is a predetermined texture, (1) while the state of the text is the edit state, the texture is not applied to the text, and (2) after the state of the text becomes the non-edit state, the texture is applied to the text.

16. The information processing method according to claim 11, wherein even if an editing operation is performed on text that is a target of application of the texture, in a case where a size of the text that is the target of application of the texture is not greater than or equal to a threshold, even if the state of the text is the edit state, the processing unit applies the texture to the text.

17. The information processing method according to claim 11, wherein the processing unit:

(1) in a case where an editing operation is performed on text that is a target of application of the texture and the texture to be applied to the text is a first texture, (a) while the state of the text is the edit state, does not apply the texture to the text, and (b) after the state of the text has entered the non-edit state, applies the texture to the text, and (2) even if an editing operation is performed on text that is the target of application of the texture, in a case where (a) the texture to be applied to the text is a second texture and (b) a size of the text that is the target of application of the texture is not greater than or equal to a threshold, even if the state of the text is the edit state, applies the texture to the text.

18. The information processing method according to claim 11, further comprising:

displaying text that is an editing target on a display.

19. The information processing method according to claim 11, wherein by rendering of a character with which texture has been composited in a character region of the text, the processing unit applies the texture to the text.

\* \* \* \* \*